Oct. 10, 1950     F. W. MERRILL     2,525,455
ROTOR FOR SYNCHRONOUS INDUCTION MOTOR
Filed June 1, 1949     2 Sheets—Sheet 1
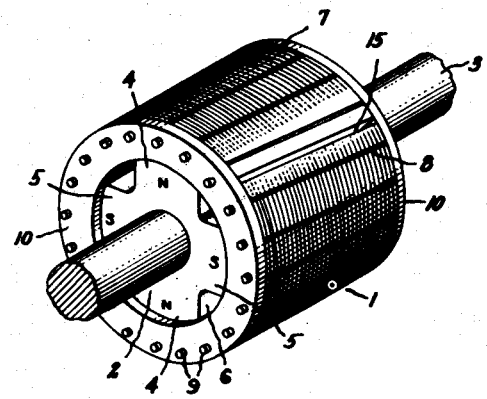
Inventor:
Frank W. Merrill,
by *Prowell & Mack*
His Attorney.

Oct. 10, 1950     F. W. MERRILL     2,525,455
ROTOR FOR SYNCHRONOUS INDUCTION MOTOR
Filed June 1, 1949     2 Sheets—Sheet 2
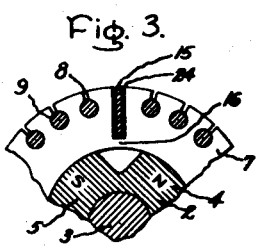
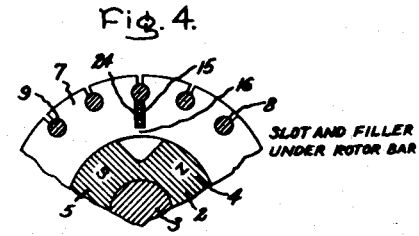
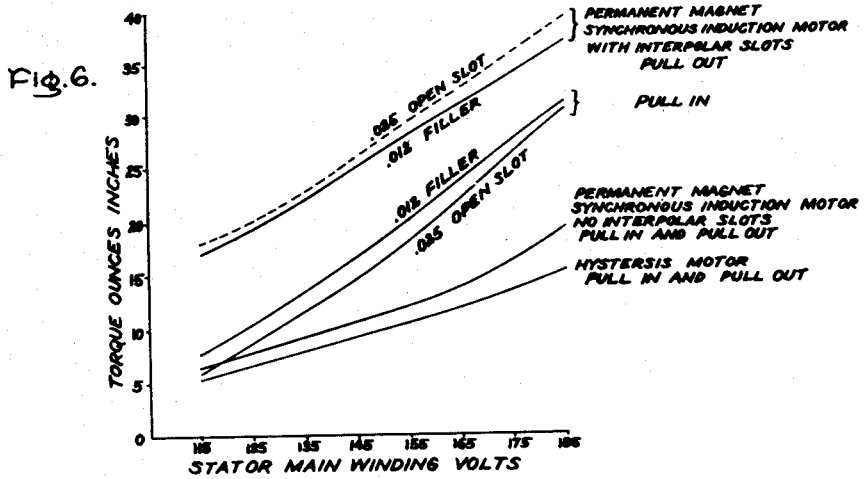
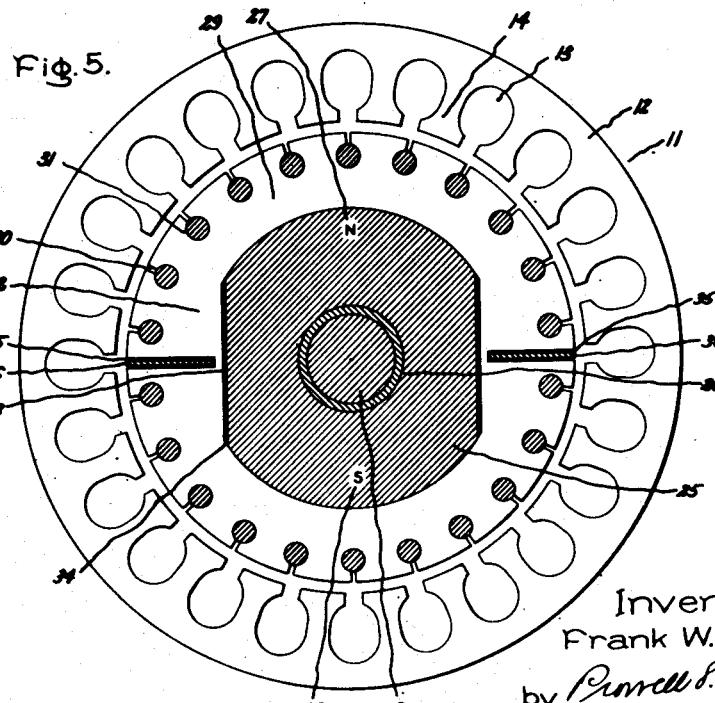
Inventor:
Frank W. Merrill,
by Prowell P. Mack
His Attorney.

Patented Oct. 10, 1950

2,525,455

UNITED STATES PATENT OFFICE 2,525,455

ROTOR FOR SYNCHRONOUS INDUCTION MOTORS

Frank W. Merrill, Fort Wayne, Ind., assignor to General Electric Company, a corporation of New York Application June 1, 1949, Serial No. 96,583

8 Claims. (Cl. 172—120)

This invention relates to rotors for dynamoelectric machines, and more particularly to permanent magnet excited rotors for synchronous induction motors.

Conventional synchronous motors are normally provided with a rotor having a certain number of direct current excited poles, the pole faces of which are usually supplied with squirrel cage bars and end rings to effect self starting and to dampen hunting. Since the direct current excited poles are of the salient variety, there are interpolar magnetic separations of considerable amount between the pole faces which prevent the short-circuiting of the direct current flux. In the fractional horsepower frame sizes, however, it is often physically inconvenient to provide salient direct current excited poles and accordingly, such motors may be provided with permanent magnet excited rotors of the type shown in Patent 2,303,893 to Friedrich Mullner, assigned to the assignee of the present application. Such rotors include a stator member with a winding energized by alternating current and a rotor member having a permanent magnet surrounded by a laminated sleeve. Slots are provided in the outer surface of the sleeve in which squirrel cage bars are positioned, the bars being short-circuited by end rings forming a short-circuited winding for self-starting. In this type of construction, however, a portion of the permanent magnet flux is short-circuited by the laminated sleeve or ring member and it is, therefore, not possible to secure maximum efficiency since a substantial amount of the permanent magnet flux does not pass through the stator at synchronism.

An object of this invention is to provide an improved rotor for dynamoelectric machines.

Another object of this invention is to provide an improved rotor for synchronous induction motors.

A further object of this invention is to provide an improved permanent magnet excited rotor for synchronous induction motors.

A still further object of this invention is to provide an improved permanent magnet excited rotor for synchronous induction motors wherein a larger percentage of the permanent magnet flux is sent through the stator of the motor at synchronism.

Further objects and advantages of this invention will become apparent and the invention will be better understood from the following description referring to the accompanying drawings, and the features of novelty which characterize this invention will be pointed out with particularity in the claims annexed to and forming part of this specification.

In accordance with one aspect of this invention, there is provided a rotor for a synchronous induction motor having a permanent magnet polarized radially to form polar areas on its outer surface. A laminated sleeve member surrounds the permanent magnet and is provided with a plurality of slots in its outer surface in which squirrel cage bars are positioned, the bars being short-circuited by end rings. Interpolar slots are provided extending radially inward substantially through the laminated sleeve member intermediate the polar areas. These interpolar slots divert a very large percentage of the permanent magnet flux through the stator at synchronism thus substantially raising the four synchronous motor characteristics of pull-in torque, pull-out torque, efficiency and power factor.

In the drawing, Fig. 1 is a view in perspective illustrating a four pole permanent magnet excited rotor constructed in accordance with this invention; Fig. 2 is a cross-sectional view of the rotor of Fig. 1 assembled in a stator illustrating the flux paths through the rotor and stator during various stages of operation; Fig. 3 is a fragmentary view in cross-section of the rotor of Fig. 1 provided with filler strips in the interpolar slots; Fig. 4 is a fragmentary cross-sectional view illustrating the arrangement of interpolar slots and filler strips under the squirrel cage bars; Fig. 5 is a cross-sectional view of a rotor provided with a two pole permanent magnet; and Fig. 6 illustrates characteristic curves of a synchronous motor provided with the rotor construction of Figs. 1, 2 and 3.

Referring now to Fig. 1, there is shown a rotor 1 for a synchronous induction motor having a permanent magnet member 2 for providing unidirectional exciting flux. The permanent magnet 2 is mounted on the rotatable shaft 3, formed of magnetic material such as steel, and is polarized radially to form polar areas 4 and 5 at its outer periphery. In the embodiment shown in Fig. 1, the permanent magnet 2 is magnetized to produce four poles and the interpolar areas are cored out, as shown at 6. A cylindrical sleeve or ring member 7 formed of a plurality of relatively thin laminations of magnetic material surrounds the permanent magnet member 2. A plurality of slots 8 are formed in the outer surface of the laminated sleeve member 7 and a plurality of squirrel cage bars 9 are respectively positioned therein, end rings 10 being provided to short-circuit the squirrel cage bars 9. Referring now to Fig. 2, there is shown a cross-sectional view of the rotor member 1 positioned in a stator member 11 having a yoke portion 12 and a plurality of winding slots 13 forming stator teeth 14. The stator member 11 may be provided with conventional three phase or two phase windings (not shown) positioned in the slots 13 and energized by alternating current.

A motor provided with a rotor as thus far described, will be self starting as an induction motor and will pull-in and run at synchronism as a synchronous motor. However, a considerable portion of the permanent magnet flux will be short-circuited by the laminated sleeve member 7. In order to divert substantially all of the permanent magnet flux to the stator, the arrangement now to be described is provided. Interpolar slots 15 are formed in the outer surface of the laminated sleeve member 7 intermediate the polar areas 4 and 5 of the permanent magnet 2 and extending radially inward to substantially the complete depth of the laminated sleeve member 7, leaving only a small bridge section 16 for mechanical strength. As will be hereinafter described, these interpolar slots together with the opposed mmf.'s of the permanent magnet flux and the stator revolving field flux will divert substantially all of the permanent magnet flux into the stator at synchronism.

In manufacturing, the permanent magnet 2 is pressed or otherwise suitably secured to the shaft 3; and the laminated sleeve member 7 including the squirrel cage bars 9 and end rings 10, is assembled over the permanent magnet. In Fig. 1, the squirrel cage slots 8 and the interpolar slots 15 are shown skewed about 15°. However, it will be readily understood that they may be angled by any other amount in accordance with conventional practice. The entire rotor assembly is then placed in a suitable four pole magnetizer and saturation flux applied to produce the polar areas 4 and 5. When the rotor 1 is removed from the magnetizer, the permanent magnet flux will traverse the laminated sleeve member 7 across the interpolar slots 15, as shown at 17 in Fig. 2. When the rotor member 1 is positioned in the stator 11, the working air gap 18 being of larger area than the interpolar slots 15, a considerable percentage of the permanent magnet flux will be diverted to the stator, as shown at 19, leaving only a small percentage magnet flux traversing the sleeve member 7 across the interpolar slots 15 as shown at 20. This drawing off of a large percentage of the permanent magnet flux lowers the flux density in the sleeve member 7 sufficiently to provide ample cross-section for the starting flux from the stator windings which co-acts with the squirrel cage bars 9 to produce the starting torque. Thus, a motor provided with the rotor of Fig. 1 will start as an induction motor with even starting torque. When the rotor speed reaches synchronism, the permanent magnet flux joins the stator revolving field flux as shown at 21. At synchronism, due to the presence of the interpolar slots 15, there is little tendency for the permanent magnet flux to be short-circuited through the sleeve member 7. Furthermore, at synchronism, the mmf.'s of the permanent magnet flux and the stator revolving field flux in the sleeve member 7 are opposed, as shown at 22 and 23, further limiting the short-circuiting of permanent magnet flux through the sleeve member 7. Thus, at synchronism, substantially all of the permanent magnet flux is diverted through the stator and the permanent magnet 2 essentially provides the principal excitation for the motor.

It has been found desirable to punch the interpolar slots 15 relatively wide with the bridge section 16 as thin radially as the mechanical strength of the laminations will permit. As will be hereinafter described, a wide interpolar slot increases pull-out torque, efficiency, and power factor, by reducing the permanent magnet flux leakage at synchronism through the laminated sleeve member 7 to a minimum. However, a wide interpolar slot may reduce the pull-in torque and if the slot is too wide, may reduce the starting torque and decrease the level of the minor hysteresis loop of the permanent magnet by an excessive amount when the rotor is removed from the magnetizer. Thus, it is desirable to provide interpolar slots of a width which will give maximum performance for output, efficiency and power factor, without seriously reducing the starting or pull-in torques or the minor hysteresis loop level. In order to secure the optimum interpolar slot width for various motor applications utilizing the same rotor punchings, filler strips 24, as shown in Fig. 3, formed of magnetic material are inserted in the interpolar slots 15. Thus by selection of the appropriate thickness of these filler strips 24, the effective width of the interpolar slots may be controlled to adjust the synchronous characteristics of the rotor.

A construction of the type shown in Figs. 1, 2 and 3 in which the interpolar slots 15 and the filler strips 24 are located in the center of a rotor tooth will be the same for each polar division of the rotor, as shown in Fig. 2, only when the number of squirrel cage bars 9 is a multiple of the number of poles. In the best induction motor design, the rotor slots are frequently not a multiple of the number of poles, for instance, 22 slots for a four pole motor. In such a case, two of the slots 15, 180° apart must be located as shown in Fig. 3, and the other two in the intermediate position 90° from the first two must be located under the squirrel cage bars 9, as shown in Fig. 4. In the event the rotor teeth are too narrow to permit squirrel cage slots to be formed therein, and the squirrel cage bars are a multiple of the number of poles, all of the interpolar slots 15 may be arranged under the squirrel cage bars 9 in the manner shown in Fig. 4. Thus, in a four pole motor as shown in Figs. 1 and 2, there will be four interpolar slots 15 formed in the rotor teeth, two in the rotor teeth as shown in Fig. 2 and two under the squirrel cage bars 9 as shown in Fig. 4; or in special cases all four interpolar slots 15 may be placed under the squirrel cage bars in the manner shown in Fig. 4.

After the rotor member 1 has been removed from the magnetizer, the permanent magnet flux, as described above, initially traverses the laminated sleeve member 7 across the interpolar slots 15 causing the flux density of the permanent magnet 2 to fall along a major hysteresis loop to a lower value determined by the reluctance of the laminated sleeve member 7 and the interpolar slots 15. When the rotor is assembled in the stator, by virtue of the lower reluctance of the working air gap 18 with respect to the interpolar slots 15, the permanent magnet flux density will rise with the operating point moving higher on the minor hysteresis loop already established by the reluctance of the laminated sleeve member 7 and the interpolar slots 15. The laminated sleeve member 7 with the interpolar slots 15, therefore, acts as a shunt gap to maintain the flux density of the permanent magnet 2 at a high level when the rotor 1 is not positioned in the stator. At synchronism, the flux density in the laminated sleeve member 7 falls to a low value by virtue of the interpolar slots 15, the permanent magnet mmf. combining with that set up by the magnetizing component of the alternating current in the stator windings. Furthermore, the flux leakage at synchronism through the laminated sleeve member 7 is less than would be present at standstill, or if the machine were operated as a generator, since the opposed mmf.'s of the permanent magnet flux and the stator revolving field flux in the laminated sleeve member further reduce the permanent magnet flux leakage. If the permanent magnet 2 is of sufficient strength, it will take over a large part of the excitation of the motor at synchronism thus, producing a substantial increase in the power factor and efficiency.

The cored out areas 6 of the permanent magnet 2 are provided since the presence of permanent magnet material under the highly saturated bridges 16 under the interpolar slots 15 would aggravate or increase the leakage of permanent magnet flux through the bridge.

Referring now to Fig. 5 in which like parts are indicated by like reference numerals, there is shown a rotor having a two pole permanent magnet 25 cast around a steel sleeve member 26. This assembly is in turn pressed onto the shaft 3. This is the preferred method of mounting the permanent magnet on the shaft, it having been found impractical to press the cast permanent magnet of the type considered here directly onto the shaft since the permanent magnet material is so brittle that it will crack rather than yield in an elastic manner. Casting the permanent magnet around a steel tube 26, as shown in Fig. 5, provides a soft center which may be turned to size instead of ground. The strength of the steel tube and the very slight clearance of its fit with the cast permanent magnet also permits the magnet and steel tube assembly to be given a light pressed fit onto the shaft 3. The permanent magnet 25 is polarized radially to form polar areas 27 and 28 at its outer surface. A sleeve member 29 formed of a plurality of relatively thin laminations of magnetic material surrounds the permanent magnet 25 and is provided with a plurality of squirrel cage slots 30 formed in its outer surface. Squirrel cage bars 31 are positioned in the squirrel cage slots 30 and are short-circuited by conventional end rings (not shown). With the two pole permanent magnet 25, the flux density in the interpolar portions of the laminated sleeve member 29 will be approximately double the four pole flux density in the laminated sleeve member 7 of Figs. 1 and 2 if something is not done to prevent it. In order to relieve this excessive flux density, it is either necessary to increase the radial thickness of the entire laminated sleeve member 29 or to provide a larger radial section at the interpolar spaces, as shown at 32. Since decreasing the diameter of the inside of the laminated sleeve member 29 would necessitate decreasing the size of the permanent magnet 25, it is more desirable to utilize the construction shown in Fig. 5 with the permanent magnet 25 being provided with flat sides 33 and the inside of the sleeve member 29 being repunched with two flat surfaces in the interpolar surfaces to relieve the flux density and bring it within the operating limits for this type of motor which have been established as 95,000 to 125,000 lines per square inch based on passing nine-tenths of the permanent magnet flux through the sleeve member after the rotor is removed from the magnetizer. These limits define the minor loop described above.

It is preferable to have the polar areas 27 and 28 cover approximately two-thirds of the pole pitch on the inside of the laminated sleeve member 29. A clearance space 34 is provided between the sides 33 of the permanent magnet 25 and the sections 32 of increased radial thickness of the laminated sleeve member 29 to allow for casting variations in the magnet 25. Here, two interpolar slots 35 are provided intermediate polar areas 27 and 28 and filler strips 36 may be inserted in the interpolar slots 35 to secure the desired synchronous characteristics, as described above. It will be readily understood that this construction utilizing sections of increased radial thickness in the laminated sleeve member at the interpolar portions is also applicable to a multipole as well as a two pole construction.

In the construction of a rotor member in accordance with Figs. 1, 2 and 3, it has been found desirable to fabricate the laminated sleeve member 7 so that the section 37 under the squirrel cage bars 9 is as radially thin as possible in order to produce a high initial flux density under the bars to secure synchronous rather than induction motor operation. Furthermore, the provision of the thin section 37 permits the use of the largest possible diameter permanent magnet 2. While a synchronous induction motor with the interpolar slots of this invention will operate satisfactorily with a thick section 37 providing low flux density under the squirrel cage bars, such a rotor will not provide the optimum space for the permanent magnet.

The magnet pole width circumferentially is preferably made to subtend two-thirds of the pole pitch on the inside surface of the laminated sleeve member 7. Permanent magnet material comprising an alloy of aluminum, nickel, cobalt, copper, titanium and iron is preferable. A rotor has been built as shown in Figs. 1, 2 and 3, having an outside diameter of 2", stacking length of 1.125", and an inside diameter of 1.25". With the rotor out of the stator, the flux density in the magnet was approximately 60,000 lines per square inch producing a permanent magnet flux density in the laminated sleeve member of section 37 of approximately 100,000 lines per square inch. When this rotor was assembled in the stator, the magnet flux density increased to approximately 65,000 lines per square inch.

Referring now to Fig. 6 an improved hysteresis type rotor was tested in a stator having a two phase 60 cycle winding; and, at an applied voltage of 165 volts, this motor produced a maximum pull-in and pull-out torque of 12 oz. inches. The rotor described above, without the interpolar slots 15, was then tested in the same stator and at the same voltage produced a maximum pull-in and pull-out torque of 14 oz. inches. The rotor was then provided with four .025" slots 15, as shown in Figs. 1 and 2, leaving a bridge section 16 of .031". With the open .025" slots, the pull-in torque at 165 volts rose to 22 oz. inches and the pull-out torque increased to 32.5 oz. inches. Filler strips 24, as shown in Fig. 3, .012" thick, were then inserted in the slots 15 and with this construction, the pull-in torque was increased to 23.75 oz. inches and the pull-out torque was reduced to 31 oz. inches. An increase in the thickness of the filler strip 24 to .016" produced slightly less pull-out torque and slightly more pull-in torque than was produced when the .012" filler strips were used.

It will now be readily apparent that the provision of the interpolar slots 15 produces a marked increase in output over a hysteresis rotor, or a permanent magnet synchronous induction rotor without the interpolar slots. It is also true, as shown by other tests, that this rotor with the interpolar slots 15 and permanent magnet excitation, produces a much greater output at higher efficiency and power factor than any type of reluctance synchronous induction motor having the same rotor dimensions and stator flux.

It will also be readily apparent that filler strips 24 of various thicknesses can be utilized to produce different operating characteristics for various applications. It will be noted that a comparatively small interpolar slot, i. e. .013" produced with a .025" slot and .012" filler strip, is required at synchronism to divert nearly all of the permanent magnet flux into the stator by virtue of the opposed mmf.'s in the laminated sleeve 7 at synchronism. Nearly as good results were obtained with a .016" filler strip which leaves a net gap of .009" per pair of poles or .0045" per pole.

It will now be readily apparent that this invention provides a permanent magnet rotor for a synchronous induction motor in which, by the use of interpolar slots, the pull-in torque is increased by 70% and the pull-out torque by 120% over a rotor with the same magnet and an unslotted laminated sleeve. Furthermore, in addition to the increase in pull-in and pull-out torque, the power factor and efficiency are greatly increased due to the substantial complete utilization of the permanent magnet flux at synchronism.

While I have illustrated and described a particular embodiment of this invention, modifications thereof will occur to those skilled in the art. I desire it to be understood, therefore, that this invention is not to be limited to the particular arrangement disclosed, and I intend in the appended claims to cover all modifications which do not depart from the spirit and scope of this invention.

What I claim as new and desire to secure by Letters Patent of the United States is:

1. A rotor for a synchronous induction motor comprising a member for producing radial unidirectional flux and having polar areas at its outer surface, a laminated sleeve member surrounding said flux producing member and having a plurality of evenly spaced slots formed in its outer surface, a plurality of squirrel cage winding conductors respectively positioned in said slots, and means for short-circuiting said conductors, said sleeve member having a relatively narrow slot in the outer surface thereof extending radially inward intermediate each of said polar areas of said flux producing member whereby a large percentage of said unidirectional flux is sent through the stator of said motor at synchronism.

2. A rotor for a synchronous induction motor comprising a permanent magnet polarized radially to form polar areas at its outer surface, a laminated sleeve member surrounding said permanent magnet and having a plurality of evenly spaced slots formed in its outer surface, a plurality of squirrel cage winding conductors respectively positioned in said slots, and means for short-circuiting said conductors, said sleeve member having a relatively narrow slot in the outer surface thereof extending radially inward intermediate each of said polar areas of said permanent magnet and intermediate a pair of said conductors whereby a large percentage of the permanent magnet flux is sent through the stator of said motor at synchronism.

3. A rotor for a synchronous induction motor comprising a permanent magnet polarized radially to form polar areas at its outer surface, a laminated sleeve member surrounding said permanent magnet and having a plurality of evenly spaced slots formed in the outer surface thereof, a plurality of squirrel cage winding conductors respectively positioned in said slots and means for short-circuiting said conductors, said sleeve member having a relatively narrow slot in the outer surface thereof each of said polar areas and extending radially inward substantially through said sleeve member whereby a large percentage of the permanent magnet flux is sent through the stator of said motor at synchronism.

4. A rotor for a synchronous induction motor comprising a permanent magnet polarized radially to form polar areas at its outer surface, a laminated sleeve member surrounding said permanent magnet and having a plurality of evenly spaced slots formed in the outer surface thereof, a plurality of squirrel cage winding conductors respectively positioned in said slots, and means for short-circuiting said conductors, said sleeve member having a relatively narrow slot in the outer surface thereof intermediate each of said polar areas of said permanent magnet and extending radially inward into said sleeve member substantially beyond said first named slots whereby a large percentage of the permanent magnet flux is sent through the stator of said motor at synchronism.

5. A rotor for a synchronous induction motor comprising a permanent magnet polarized radially to form polar areas at its outer surface, a laminated sleeve member surrounding said permanent magnet and having a plurality of evenly spaced slots formed in its outer surface, a plurality of squirrel cage winding conductors respectively positioned in said slots, and means for short-circuiting said conductors, said sleeve member having a relatively narrow slot formed therein extending radially inward intermediate each of said polar areas of said permanent magnet whereby a large percentage of the permanent magnet flux is sent through the stator of said motor at synchronism, at least one of said narrow slots being positioned under one of said evenly spaced slots.

6. A rotor for a synchronous induction motor comprising a permanent magnet polarized radially to form polar areas at its outer surface, a laminated sleeve member surrounding said permanent magnet and having a plurality of evenly spaced slots formed in its outer surface, a plurality of squirrel cage winding conductors respectively positioned in said slots, means for short-circuiting said conductors, said sleeve member having a relatively narrow slot in the outer surface thereof intermediate each of said polar areas of said permanent magnet and extending radially inward substantially beyond said first named slots whereby a large percentage of the permanent magnet flux is sent through the stator of said motor at synchronism, and means in said other slots for controlling the synchronous characteristics of said motor.

7. A rotor for a synchronous induction motor comprising a permanent magnet polarized radially to form polar areas at its outer surface, a laminated sleeve member surrounding said permanent magnet and having a plurality of evenly spaced slots formed in its outer surface, a plurality of squirrel cage winding conductors respectively positioned in said slots, means for short-circuiting said conductors, said sleeve member having a relatively narrow slot in the outer surface thereof intermediate each of said polar areas of said permanent magnet and extending radially inward substantially beyond said first named slots whereby a large percentage of the permanent magnet flux is sent through the stator of said motor at synchronism, and strips of magnetic material respectively positioned in said other slots for controlling the synchronous characteristics of said motor.

8. A rotor for a synchronous induction motor comprising a permanent magnet polarized radially to form polar areas at its outer surface, a laminated sleeve member surrounding said permanent magnet and having a plurality of evenly spaced slots formed in its outer surface, a plurality of squirrel cage winding conductors respectively positioned in said slots, and means for short-circuiting said conductors, said sleeve member having a relatively narrow slot in the outer surface thereof intermediate each of said polar areas of said permanent magnet and extending radially inward substantially beyond said first mentioned slots whereby a large percentage of the said permanent magnet flux is sent through the stator of said motor at synchronism, the width of said other slots being smaller than the width of the working air gap of said motor.

FRANK W. MERRILL.

REFERENCES CITED

The following references are of record in the file of this patent:

UNITED STATES PATENTS

| Number | Name | Date |
| --- | --- | --- |
| 2,257,824 | Tognola | Oct. 7, 1941 |
| 2,303,893 | Mullner | Dec. 1, 1942 |